(12) United States Patent
Abdi Taghi Abad et al.

(10) Patent No.: US 10,891,521 B2
(45) Date of Patent: Jan. 12, 2021

(54) ADJUSTING TRAINING SET COMBINATION BASED ON CLASSIFICATION ACCURACY

(71) Applicant: Capital One Services, LLC, McLean, VA (US)

(72) Inventors: Fardin Abdi Taghi Abad, Champaign, IL (US); Jeremy Edward Goodsitt, Champaign, IL (US); Austin Grant Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/705,222

(22) Filed: Dec. 6, 2019

(65) Prior Publication Data
US 2020/0110969 A1    Apr. 9, 2020

Related U.S. Application Data

(63) Continuation of application No. 16/441,649, filed on Jun. 14, 2019, now Pat. No. 10,534,984, which is a continuation of application No. 16/151,825, filed on Oct. 4, 2018, now Pat. No. 10,402,691.

(51) Int. Cl.
*G06K 9/00* (2006.01)
*G06K 9/62* (2006.01)
*G06N 20/00* (2019.01)

(52) U.S. Cl.
CPC .......... *G06K 9/6262* (2013.01); *G06K 9/628* (2013.01); *G06K 9/6253* (2013.01); *G06K 9/6257* (2013.01); *G06N 20/00* (2019.01)

(58) Field of Classification Search
CPC combination set(s) only.
See application file for complete search history.

(56) References Cited

U.S. PATENT DOCUMENTS

| | | | | |
|---|---|---|---|---|
| 5,323,317 A * | 6/1994 | Hampton | ........... | G01S 13/86 702/3 |
| 5,555,317 A * | 9/1996 | Anderson | ........... | G06K 9/6256 382/159 |
| 2002/0159641 A1 * | 10/2002 | Whitney | ........... | G06K 9/6228 382/219 |
| 2003/0046006 A1 * | 3/2003 | Eastwood | ........... | G01V 1/34 702/14 |
| 2007/0253625 A1 * | 11/2007 | Yi | ........... | G01S 13/89 382/228 |
| 2008/0082466 A1 * | 4/2008 | Meijer | ........... | G06N 20/00 706/12 |
| 2008/0103996 A1 * | 5/2008 | Forman | ........... | G06N 20/00 706/12 |
| 2016/0300123 A1 * | 10/2016 | Jewell | ........... | G06F 3/04842 |

* cited by examiner

*Primary Examiner* — Alex Kok S Liew
(74) *Attorney, Agent, or Firm* — Kacvinsky Daisak Bluni PLLC

(57) ABSTRACT

Various embodiments are generally directed to techniques of adjusting the combination of the samples in a training batch or training set. Embodiments include techniques to determine an accuracy for each class of a classification model, for example. Based on the determined accuracies, the combination of the samples in the training batch may be adjusted or modified to improve the training of the classification model.

20 Claims, 9 Drawing Sheets

FIG. 2A

Classification Model 210

| Class A | Class B | Class C | Class D | Class E |

FIG. 2B

Training Batch 220    Size = 100 Samples

| Sample A1 | Sample B1 | Sample C1 | Sample D1 | Sample E1 |
| Sample A2 | Sample B2 | Sample C2 | Sample D2 | Sample E2 |
| Sample A3 | Sample B3 | Sample C3 | Sample D3 | Sample E3 |
| Sample A4 | Sample B4 | Sample C4 | Sample D4 | Sample E4 |
| Sample A5 | Sample B5 | Sample C5 | Sample D5 | Sample E5 |
| ⋮ | ⋮ | ⋮ | ⋮ | ⋮ |
| Sample A20 | Sample B20 | Sample C20 | Sample D20 | Sample E20 |

FIG. 2C

Classification Model 210    Min. = 2 Samples

| Class A | Class B | Class C | Class D | Class E |
| 35% Accurate | 70% Accurate | 60% Accurate | 85% Accurate | 90% Accurate |
| Weight = (35/45) * 54 = 42 extra samples | Minimum # of samples | Weight = (10/45) * 54 = 12 extra samples | Minimum # of samples | Minimum # of samples |

FIG. 2D

Training Batch 222

| Sample A1 | Sample B1 | Sample C1 | Sample D1 | Sample E1 |
| ⋮ | Sample B2 | ⋮ | Sample D2 | Sample E2 |
| Sample A20 | | Sample C20 | | |
| Sample A21 | | Sample C21 | | |
| Sample A22 | | Sample C22 | | |
| ⋮ | | ⋮ | | |
| Sample A62 | | Sample C32 | | |

FIG. 2E

Classification Model 210

| Class A | Class B | Class C | Class D | Class E |
| 72% Accurate | 70% Accurate | 74% Accurate | 85% Accurate | 90% Accurate |

FIG. 3A

Classification Model 310

| Class A | Class B | Class C | Class D | Class E |

FIG. 3B

Training Batch 320    Size = 100 Samples

| Sample A1 | Sample B1 | Sample C1 | Sample D1 | Sample E1 |
| Sample A2 | Sample B2 | Sample C2 | Sample D2 | Sample E2 |
| Sample A3 | Sample B3 | Sample C3 | Sample D3 | Sample E3 |
| Sample A4 | Sample B4 | Sample C4 | Sample D4 | Sample E4 |
| Sample A5 | Sample B5 | Sample C5 | Sample D5 | Sample E5 |
| ⋮ | ⋮ | ⋮ | ⋮ | ⋮ |
| Sample A20 | Sample B20 | Sample C20 | Sample D20 | Sample E20 |

FIG. 3C

Classification Model 310    Threshold = 70%    Desired = 80%

| Class A | Class B | Class C | Class D | Class E |
| 35% Accurate | 70% Accurate | 60% Accurate | 85% Accurate | 90% Accurate |
| Weight = (35/45) * 36 = 28 extra samples | Keep Same # of Samples | Weight = (10/45) * 36 = 8 extra samples | Minimum # of samples | Minimum # of samples |

FIG. 3D

Training Batch 322    Min. = 2 Samples

| Sample A1 | Sample B1 | Sample C1 | Sample D1 | Sample E1 |
|  | Sample B2 |  | Sample D2 | Sample E2 |
| Sample A20 | Sample B3 | Sample C20 |  |  |
| Sample A21 | Sample B4 | Sample C21 |  |  |
| Sample A22 | Sample B5 | Sample C22 |  |  |
| ⋮ | ⋮ | ⋮ |  |  |
| Sample A48 | Sample B20 | Sample C28 |  |  |

FIG. 3E

Classification Model 310

| Class A | Class B | Class C | Class D | Class E |
| 70% Accurate | 72% Accurate | 70% Accurate | 85% Accurate | 90% Accurate |

500

GENERATE A TRAINING BATCH (OR TRAINING BATCHES) TO TRAIN A CLASSIFICATION MODEL FOR A PARTICULAR NUMBER OF ITERATIONS
502

TRAIN THE CLASSIFICATION MODEL, USING THE GENERATED TRAINING BATCH OR TRAINING BATCHES, FOR THE PARTICULAR NUMBER OF ITERATIONS
504

DETERMINE AN ACCURACY FOR EACH CLASS OF THE CLASSIFICATION MODEL BASED ON THE TRAINING
506

PERFORM AN ADJUSTMENT OF THE TRAINING BATCH OR TRAINING BATCHES BASED ON THE DETERMINED ACCURACY OF EACH CLASS
508

TRAIN THE CLASSIFICATION MODEL, USING THE ADJUSTED TRAINING BATCH OR TRAINING BATCHES, FOR ANOTHER PARTICULAR NUMBER OF ITERATIONS
510

GENERATE AT LEAST ONE TRAINING BATCH FOR TRAINING A CLASSIFICATION MODEL
602

TRAIN THE CLASSIFICATION MODEL, USING THE GENERATED TRAINING BATCH, FOR A NUMBER OF ITERATIONS
604

DETERMINE AN ACCURACY FOR EACH CLASS OF THE CLASSIFICATION MODEL BASED ON THE TRAINING
606

COMPARE THE DETERMINED ACCURACY OF ONE CLASS RELATIVE TO THE ACCURACIES OF THE OTHER CLASSES TO GENERATE ONE OR MORE WEIGHTED VALUES CORRESPONDING TO THE CLASSES
608

DETERMINE, BASED ON THE ONE OR MORE WEIGHTED VALUES, HOW MANY SAMPLES ARE TO BE INCLUDED IN EACH CLASS
610

PERFORM AN ADJUSTMENT OF THE TRAINING BATCH IN ORDER TO INCLUDE THE DETERMINED NUMBER OF SAMPLES FOR EACH CLASS
612

*FIG. 6*

ADJUSTING TRAINING SET COMBINATION BASED ON CLASSIFICATION ACCURACY

RELATED APPLICATIONS

This application is a Continuation of U.S. patent application Ser. No. 16/441,649, entitled "ADJUSTING TRAINING SET COMBINATION BASED ON CLASSIFICATION ACCURACY" filed on Jun. 14, 2019, which is a Continuation of U.S. patent application Ser. No. 16/151,825, entitled "ADJUSTING TRAINING SET COMBINATION BASED ON CLASSIFICATION ACCURACY" filed on Oct. 4, 2018 (issued as U.S. Pat. No. 10,402,691 on Sep. 3, 2019). The contents of the aforementioned patent applications are incorporated herein by reference in there entireties.

BACKGROUND

Classification relates to the process of categorizing new or unknown information based on already known categorizations of similar information.

For example, a classifier may perform the classification. The classifier may define various classes that relate to different types of information. An e-mail classifier, for instance, may separately define a "legitimate e-mail" class and a "spam e-mail" class. To improve classification accuracy, a data set containing samples that are known to belong to certain classes may be used to "train" the classifier. Thus, in the e-mail classifier example, a data set containing both known legitimate e-mails and spam e-mails may be utilized to train the classifier over many iterations so that it can know how to accurately categorize a new, unknown e-mail as legitimate or spam.

As a classifier gets more complex, however, the classes may exhibit varying levels of performance or accuracy during training. Accordingly, there is a need to efficiently identify and rehabilitate inaccurate or underperforming classes during the training process to improve the overall effectiveness and accuracy of the classifier.

BRIEF DESCRIPTION OF THE DRAWINGS

FIGS. 2A/2B/2C/2D/2E illustrate a classification model and a second example adjustment of a training batch in accordance with one or more embodiments.

FIGS. 3A/3B/3C/3D/3E illustrate a classification model and a third example adjustment of a training batch in accordance with one or more embodiments.

FIG. 5 illustrates an example flow diagram in accordance with one or more embodiments.

FIG. 6 illustrates an example flow diagram in accordance with one or more embodiments.

DETAILED DESCRIPTION

Figure 1A:
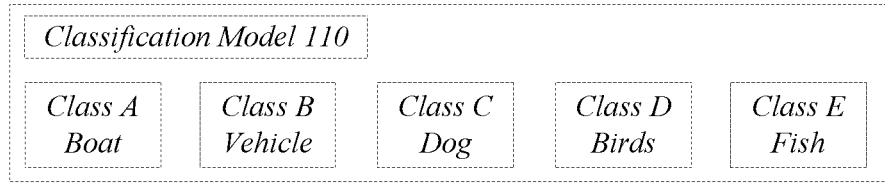
FIGS. 1A/1B/1C/1D/1E illustrate a classification model and a first example adjustment of a training batch in accordance with one or more embodiments.

Various embodiments are generally directed to adjusting, or making modifications to, the combination of samples in one or more training batches or training sets based on the accuracy of each class of a classification model. The adjusted or modified training batch may be used to train the classification model and improve at least the overall effectiveness and accuracy of the model. This process may be repeated until a desired or target level of accuracy is achieved for each class.

For example, one or more training batches (or training sets) may be generated by at least one computing device, where each training batch has a constant size and contains a set number of samples that are associated with each class. Alternatively, the size of the training batch may be changeable or variable, and not set. The one or more training batches may then be used to train the classification model for a number of iterations, e.g., epochs. Based on the training, an accuracy corresponding to each class may be determined. The accuracy may be interpreted broadly and may relate to classification accuracy, precision, recall, F1 score the class, or any combination thereof. Based on the accuracy of each class, the one or more training batches may be adjusted or modified for use in the next training session. For instance, the number of samples associated with the class exhibiting low accuracy may be increased in the training batch to improve the accuracy of that class.

According to embodiments, the training batch may be adjusted in various ways. In one example, the adjustment of the number of samples associated with a class may be directly proportional to the accuracy level of that class, e.g., the lower the accuracy of the class, the more samples related to that class is added. The adjustment may be dynamic. In another example, the accuracy of at least one class may be compared to the others, whereby weighted values may be calculated for all relevant classes to determine what percentage of the total number of samples in the training batch is to be allocated to those classes. In yet another example, an accuracy threshold value, e.g., a value that is lower than the desired or target accuracy, may be used to quickly improve the accuracy of all relevant classes up to the accuracy threshold value. Reaching the desired accuracy in some cases may not always be guaranteed, so the utilization of the accuracy threshold value ensures that the accuracies reach an acceptable level even if the desired or target accuracy cannot be reached. In examples where the size of the training batch is variable or changeable, more samples may be added to the batch until a desired accuracy for each class is obtained.

In previous solutions, one of the problems in training classification models is balancing training data such that the model can learn the structure of all the classes. Some classes may be easier to train and/or learn than others, and thus, at the end of training iterations, the training or learning of all the classes may not be consistent. The above described embodiments and examples described herein are advantageous over the previous solutions in numerous ways. For example, the overall speed of training and the quality of classification for all the classes of the classification model are both increased. By diagnosing all classes of the classification model and focusing primarily on those classes that need improvement, the training process is more efficient and streamlined. Since the training of the classification model is quicker and more accurate, the overall effectiveness and accuracy of classification using the classification model is also quicker, more accurate, and improved.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1A illustrates an example classification model, e.g., classification model 110. By way of example, the classification model 110 may be an image classifier and may include at least five different classes: class A, class B, class C, class D, and class E. As shown, class A classifies various types of boats, class B classifies various types of vehicles, class C classifies various types of dogs, class D classifies various types of birds, and class E classifies various types of fish. The classification model 110 is configured to receive a new, unknown information, an image for example, and determine the type of image.

It may be understood that the classification model 110 may be any other suitable classifier configured to classify various types of data and not limited to just images. And while FIG. 1A illustrates five classes, it may be understood that there may be more (or fewer) classes than five.

Figure 1B:
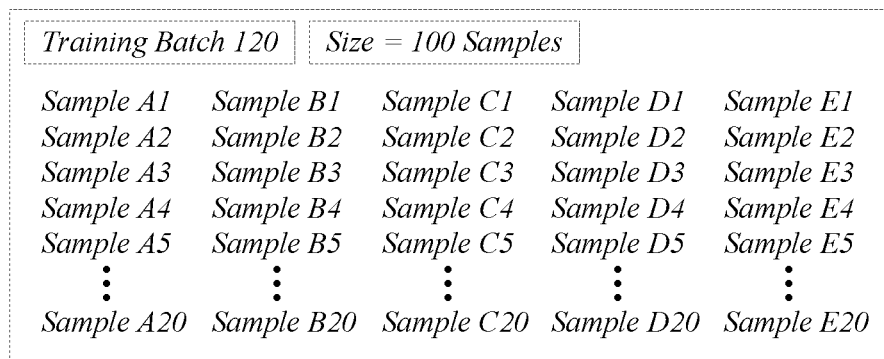

FIG. 1B illustrates an example training set or data, e.g., training batch 120, that may be used to train the classification model 110. As shown, training batch 120 may have a constant batch size of 100 samples. Initially, when the training batch 120 is generated, each class may have an equal number (or approximately equal, if the batch size is not evenly divisible) of samples. Since there are five classes in the classification model 110, each class includes 20 samples. For example, class A may include samples A1, A2, A3, and so on up to sample A20. Sample A1 may be an image of a sailboat. Sample A2 may be an image of a fishing boat. Sample A3 may be an image of a speedboat. Sample A20 may be an image of a canoe. Collectively, these samples can "train" class A of the classification model 110 so that when the model receives a new image of a type of boat, for instance, it can properly classify the image as belonging in class A.

Similarly, sample B1 may be an image of a sports car. Sample B2 may be an image of a pickup truck. Sample B20 may be an image of a sport utility vehicle (SUV). Sample C1 may be an image of a gold retriever. Sample C2 may be an image of a miniature poodle. Sample C20 may be an image of beagle. Sample D1 may be an image of an eagle. Sample D2 may be an image of a robin. Sample D20 may be an image of a parrot. Sample E1 may be an image of a tuna. Sample E2 may be an image of a goldfish. Sample E20 may be an image of a dolphin. As set forth above, collectively, all of these samples are used to train each respective class of the classification model 110 so that the model receives and correctly classifies new images.

Figure 1C:
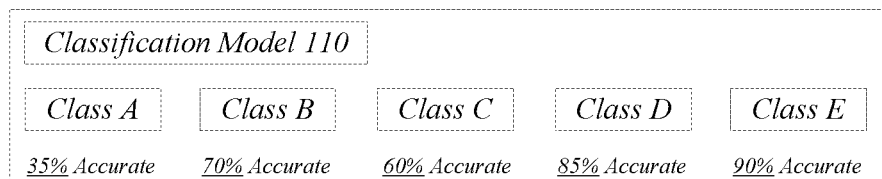

FIG. 1C illustrates example accuracy measurements for the classes of the classification model 110. For example, the training batch 120 illustrated in FIG. 1B may be used to train the classification model 110 for a specific number of iterations, e.g., epochs. That number may be predefined or preset or may be dynamically determined. After running the training batch 120 on the classification model 110 for the specific number of iterations, the accuracy of each class may be determined. The term accuracy is used broadly and may include any suitable form of an accuracy metric, measurement, value, number, etc. In this example, the training batch 120 may be run for three epochs. As shown, the accuracy of class A is 35%, the accuracy of class B is 70%, the accuracy of class C is 60%, the accuracy of class D is 85%, and the accuracy of class E is 90%.

The term "accuracy" may be interpreted broadly and may encompass any suitable metric that indicates the state of being correct, precise, exact, etc. It encompasses classification accuracy, precision, recall, F1 score, sensitivity, or any suitable measurement of data related to statistical analysis.

In one example, classification accuracy is the number of correct predictions made divided by a total number of predictions made, multiplied by 100 so as to result in a percentage. In another example, precision is the number of true positives (e.g., detection of a condition when that condition is present) divided by the number of true positives and false positives (e.g., detection of an incorrect indication that a particular condition is present). Precision is thus a measure of the exactness of the class or the overall classification model. In a further example, recall is the number of true positives divided by the number of true positives and the number of false negatives (e.g., detection of an incorrect indication that a particular condition is absent). In another example, F1 score is 2 multiplied by ((precision*recall)/(precision+recall)). Thus, the F1 may indicate the balance between the precision and the recall. One, or a combination, of these examples may be used to determine the accuracies of each class of the classification model.

Figure 1D:
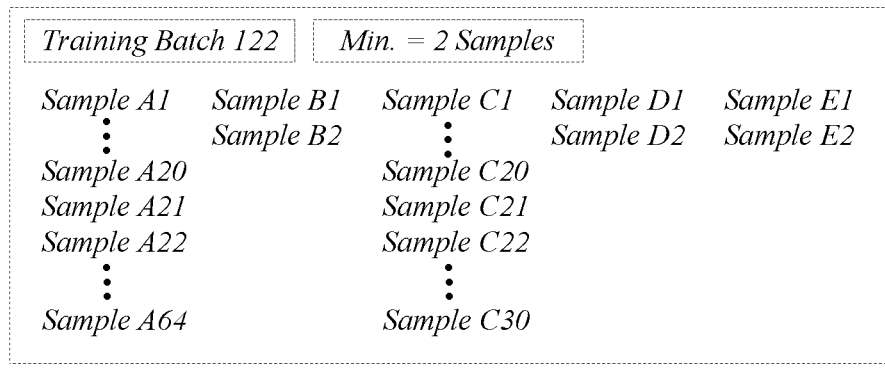

FIG. 1D illustrates an adjusted, or modified, training batch 122 based on the previously determined class accuracies. Specifically, for instance, the combination of the samples in the training batch 122 is adjusted. The adjusted training batch 122, as illustrated, can be a modified version of training batch 120 itself or may be a newly generated training batch containing one or more samples identical to the ones in training batch 120. In either instance, it may be understood that the training batch 122 is an adjusted or modified version of training batch 120.

In embodiments, the adjustment of the training batch relates to the dynamic increasing or decreasing of the number of samples associated with each class. Because the size of the training batch in this example is constant and set at 100 samples, the number of samples for classes that meet or exceed a desired or a target accuracy level may be decreased so as to increase the number of samples of classes that do not meet the target accuracy, thereby maintaining the size of the training batch. Moreover, in embodiments, the training batch must contain a minimum number of samples for each class, regardless of accuracy, which may be, for instance, two samples per class as illustrated. It may be understood that the minimum number of samples may be any suitable number and may be a variable value, for example, depending on the type of classification model, training data, etc.

In the example shown, the accuracy desired for each class may be 70%. This may be predetermined or predefined, e.g., by a user. In other instance, it may be understood that "desired" may be interpreted as any standard target level in the industry or any target level that is appropriate with respect to the classification model and the type thereof. Because classes B, D, and E either meet or exceed the desired accuracy level, it may be determined that only a minimum number of samples for those classes is required. This not only provides the advantage of gaining 54 samples (20 total samples for each class minus two minimum samples multiplied by 3 classes) in the training batch to reserve for classes that do not meet the desired accuracy, but also increases the overall training process of the classification model 110 in that, for example, processing resources related to improving the accuracy of classes B, D, and E is not expended. Thus, the number of samples associated with classes B, D, and E may be decreased to two samples each, as shown, which leaves room for 54 extra samples.

In embodiments, a proportion-based analysis may be used to determine how many of the 54 samples should be associated with a particular class. For example, the difference between the calculated accuracy of class A and the desired accuracy of 70% (the difference is 35%) is greater than the difference between the calculated accuracy of class C and the desired accuracy (the difference being 10%). Proportionally, more of the 54 samples may be associated with class A than class C, for example, twice, three, or four times as much, to quickly improve the accuracy of class A. Thus, FIG. 1D illustrates that the training batch has been adjusted to include 44 more samples associated with class A and ten more samples associated with class C.

As set forth above, the adjustment of the training batch, e.g., determining what type and how many samples to add or subtract, may be entirely dynamic. Or, it may be pre-defined or predetermined, e.g., by a user.

Figure 1E:
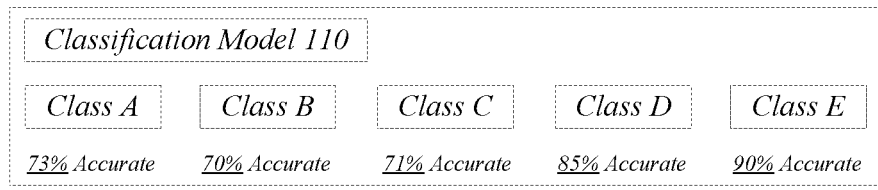

FIG. 1E illustrates a result of training the classification model 110 with the adjusted training batch. As shown, the accuracy of class A is now 73%, an improvement of 38%. The accuracy of class C is 71%, an improvement of 11%. All the while, the accuracies of classes B, D, and E remain the same. It may be understood that improving the accuracies of the classes may be an iterative process. Thus, the training batch may be adjusted multiple times before reaching desired accuracy levels. Moreover, although FIG. 1C shows decreasing the number of samples in classes B, D, and E all the way down to the minimum allotted number of samples, in other examples, the samples in one or more of the classes B, D, and E may be decreased to any other suitable number, or, may not be decreased at all.

FIG. 2A illustrates a classification model 210 and FIG. 2B illustrates a training batch 220 for training the classification model 210. Similar to FIG. 1A, classification model 210 includes at least five different classes: class A, class B, class C, class D, and class E. And similar to FIG. 1B, training batch 220 has a set, constant size of 100 samples, a fifth of which is evenly allocated to each class, e.g., each class includes 20 samples.

FIG. 2C illustrates the calculated accuracies of each class after training classification model 210 with training batch 220, the values which are similar to the ones illustrated in FIG. 1C. However, the example shown in FIG. 2C is a variation of the example illustrated in FIG. 1C in that one or more weighted values are determined to, in turn, determine how many samples of the classes having accuracies that fall below the desired accuracy level to include in the adjusted batch. Assuming again that the desired accuracy level is 70%, the minimum number of samples, e.g., 2 samples, may be allocated to the classes that either meet or exceed that desired threshold, e.g., classes B, D, and E. Weighted values are calculated to determine exactly how many samples of the 54 extra samples should of class A and of class C.

In one example, the weighted values may be calculated by first determining the percentage difference between the actual accuracy of class A and the desired accuracy. The same applies for class C. Thus, the percentage difference for class A is 35% and the percentage difference for class C is 10%. Thereafter, the overall percentage of the percentage difference of class A or C compared to the total of the percentage differences of class A and C is determined, and then, multiplied by the total number of available samples to obtain the weighted value for the respective class. For instance, the weighted value for class A is as follows: dividing the total percentage differences of classes A and C (45%) by the percentage difference of class A (35%) and multiplying that number by the total number of samples available to be allocated (54 samples) to obtain 42 samples. Similarly, the weighted value for class C is as follows: dividing the total percentage differences of classes A and C (45%) by the percentage difference of class C (10%) and multiplying that number by the total number of samples available to be allocated (54 samples) to obtain 12 samples. To that end, the weighted values may be determined based on a "percentage-of-a-percentage" weighting approach. It may be understood that the weighted values may be calculated based on other suitable weighting approaches.

FIG. 2D illustrates an adjusted training batch 222, the adjustment which was based on the determined weighted values. As shown, 42 extra samples are associated with class A, and 12 extra samples are associated with class C. The size of the adjusted training batch 222 remains at 100 samples. The classification model 210 may then be trained for an additional number of iterations, e.g., epochs, using the adjusted training batch 222. As illustrated in FIG. 2E, the accuracy of class A increased by 37% and the accuracy of class C increased by 14% (3% more than the accuracy improvement in FIG. 1E based on the 2 additional samples).

FIGS. 3A and 3B illustrate a classification model 310 and a training batch 320 identical to the classification model and training batch of FIGS. 2A to 2E. In FIG. 3C, however, an accuracy threshold value may be implemented. This value may be predetermined or predefined. For example, the desired or target in this example may be 80%. A threshold value that is lower than the desired accuracy, e.g., 70%, may be set to ensure that all classes reach an acceptable level of accuracy, e.g., 70%, regardless of whether the classes achieve the desired accuracy of 80%. To at least that end, the accuracy threshold value, not the desired accuracy, may be used as the baseline for the weighted value calculations.

By way of example, as shown in FIG. 3C, because the accuracies of class D and E exceed the desired accuracy, the number of samples in those classes can be reduced to the minimum number of samples, e.g., two samples. For class B, unlike the example shown in FIG. 2C, the original number of samples allocated for class B in training batch 320 is maintained. Although class B meets the accuracy threshold value of 70%, there is still 10% room for improvement to meet the desired accuracy of 80%. By keeping the same number of samples, the accuracy of class B may improve over multiple iterations. It may be understood that the number of samples for classes that meet or exceed the accuracy threshold value, but not the desired accuracy, may be dynamically adjusted and suitably balanced according to different training scenarios.

By keeping the same number of samples for class B, there are now 36 extra samples (18 each from classes D and E) to be allocated between classes A and C. A similar (or the same) weighting technique described above with respect to FIG. 2C may be used to determine that 28 extra samples of the 36 samples are of class A and eight extra samples of the 36 samples are of class C. FIG. 3D illustrates an adjusted training batch 322.

FIG. 3E illustrates the class accuracies of the classification model 310 after being subsequently trained with the adjusted training batch 322 for one or more iterations. Classes A and C have reached the accuracy threshold value of 70%. Moreover, the accuracy of class B increased by 2%. While classes A, B, and C have not yet reached the desired accuracy level of 80%, they have reached the accuracy threshold, which ensures that all classes in the classification model 310 exhibit an acceptable level of accuracy. As set forth above, the accuracy threshold value may be preset, predefined, or predetermined, for example, by a user or other types of metric related to the classification model 310.

Figure 4A:
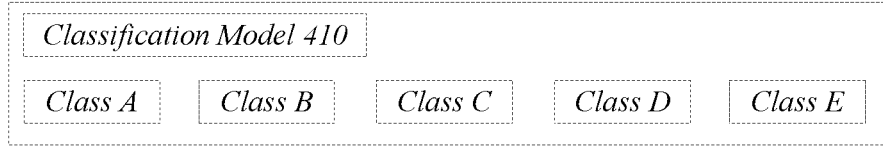
FIGS. 4A/4B/4C/4D/4E illustrate a classification model and a fourth example adjustment of a training batch in accordance with one or more embodiments.
Figure 4B:
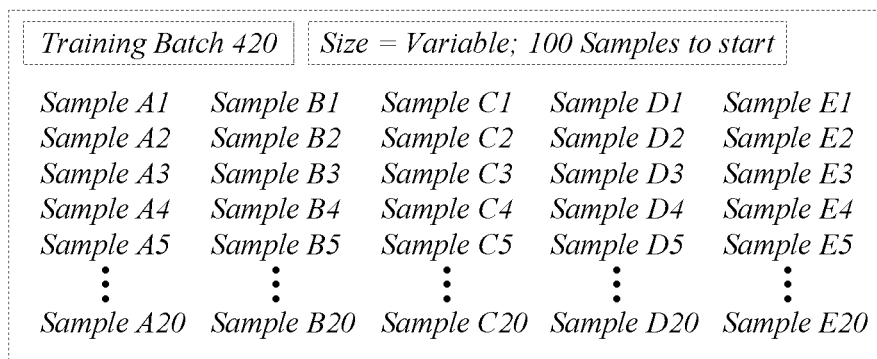

FIG. 4A illustrates a classification model 410 and is similar to the models illustrated in FIGS. 1A, 2A, and 3A. It contains at least five different classes: classes A, B, C, D, and E, and may be an image classifier. FIG. 4B, however, illustrates a training batch 420 that is variable, e.g., adjustable in size, and not constant like the training batches shown in FIGS. 1B, 2B, and 3B. To start, the training batch 420 may have 100 samples, a fifth of which are allocated to each class. But, depending on the accuracies of the classes after training the classification model 410 with the training batch 420, the size of the batch may be adjusted, e.g., dynamically increased or decreased.

Figure 4C:
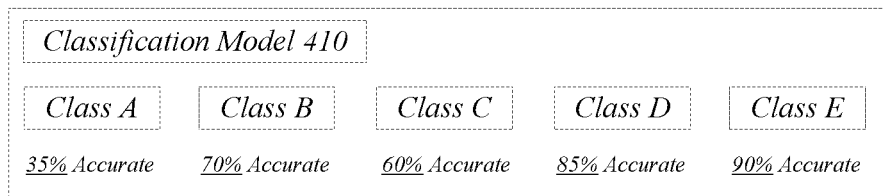

FIG. 4C illustrates the accuracies of each class after the classification model 410 has been trained with the training batch 420. Class A has an accuracy of 35%, class B has an accuracy of 70%, class C has an accuracy of 60%, class D is 85% accurate, and class E is 90% accurate. The number of samples in the training batch may dynamically be adjusted based on these calculated accuracies.

Figure 4D:
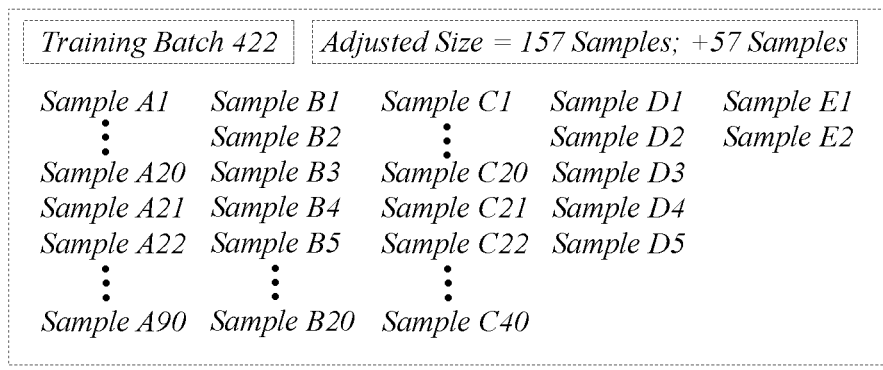

FIG. 4D illustrates an adjusted training batch 422. It may be determined that because class E has an accuracy level, 90%, well above the desired accuracy of 70%, only the minimum number of samples associated with class E may be assigned to it, e.g., two samples. As class D is less accurate than class E, but not by much, five samples may be included in class D. For class B, because its accuracy is exactly at the desired level, the number of samples may be unchanged.

As for classes A and C, classes that have accuracies that fall below the desired accuracy level, samples for classes A and C may be added to quickly and efficiently increase their respective accuracies to or above the desired accuracy of 70%. For instance, the determination of how many samples to add may be based on a multiplier or a factor, e.g., add 20 or more samples for each 10%. Thus, for class C, the 10% difference between its actual accuracy and the desired accuracy may result in an additional 20 samples allocated to that class. With respect to the 35% difference between the actual and desired accuracies for class A, an additional 70 samples may be added to that class. In that regard, the size of the adjust training batch 422, compared to training batch 420, increased by 57 samples.

It may be understood that the training batch may be dynamically adjusted in other suitable ways, e.g., other types of factors, multipliers, algorithms, hardware/software capabilities, predetermined values, various metrics, weighting values or algorithms, etc. It may also be understood that as the batch size becomes larger, more computing or processing resources may be needed. The size may thus be adjusted in view of such capabilities.

Figure 4E:
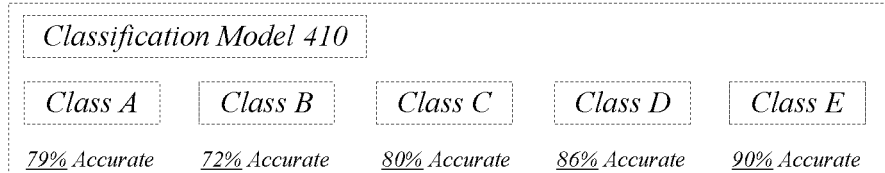

FIG. 4E illustrates class accuracies after the classification model 410 is subsequently trained with the adjusted training batch 422. As shown, the accuracy for class A increased significantly to 79% from 35%. And the accuracy for class C increased to 80% from 60%. The accuracies for class B and D improved slightly, and the accuracy for class E remained the same.

FIG. 5 illustrates a flow diagram 500 of adjusting a training batch in accordance with the embodiments of FIGS. 1A to 1E and/or FIGS. 4A to 4E. It may be understood that each block illustrated in the flow diagram 500 may be executed or implemented by one or more computing devices, which will be further discussed below. Moreover, it will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Further, the blocks are not required to be arranged in any particular order.

In block 502, a training batch (or more than one training batch) may be generated to train a classification model for a number of iterations, e.g., a predetermined number of epochs, etc. The classification model may define one or more classes, as described above. In one example, the training batch may include a set number of samples that are associated with one or more of the classes. In another example, the size of the training batch may be changeable or variable, not set.

In block 504, the classification model is trained using the generated training batch for the number of iterations specified in block 502, which may be predetermined. In block 506, an accuracy is determined for each class based on the training in block 504. As described above, the term "accuracy" should be understood to be broad. It may be a classification accuracy value, a precision metric, a recall metric, an F1 score, or any combination thereof.

In block 508, the training batch is adjusted based on the determined accuracies of the classes. More specifically, the types (and/or the number) of samples in the training batch may be adjusted. For example, if there are classes that have accuracies that either meet or exceed a desired accuracy level, then the samples for those classes may be decreased in the training batch. Whereas, the number of samples associated with classes having accuracies that fall below the desired accuracy level are increased.

Upon adjusting the training batch in block 508, the adjusted training batch is used to train the classification model again for another number of iterations. The flow 500 illustrated in FIG. 5 may be repeated until the accuracy levels of each class reach or exceed the desired accuracy.

FIG. 6 illustrates a flow diagram 600 of adjusting a training batch in accordance with the embodiments of FIGS. 2A to 2E. In block 602, at least one training batch may be generated for training a classification model, where the classification model, again, defines one or more classes and the training batch includes samples corresponding to those classes. In block 604, the classification model is trained for a number of iterations using the generated training batch. And in block 606, the accuracy of each class is determined.

In block 608, the accuracies of the classes are compared relative to each other to determine one or more weighted values, which may then be used to determine how to allocate the samples of the training batch to the classes. For example, for each class that falls below a desired accuracy level, the percentage difference between the accuracy of that class and the desired accuracy is calculated. Those differences may be then used to determine the weighted values for the relevant classes, as described above. The weighted value may be applied to the total available number of extra samples, which will indicate how many of the extra samples of that class can be included in the adjusted training batch. In block 612, an adjustment of the training batch is performed.

Figure 7:
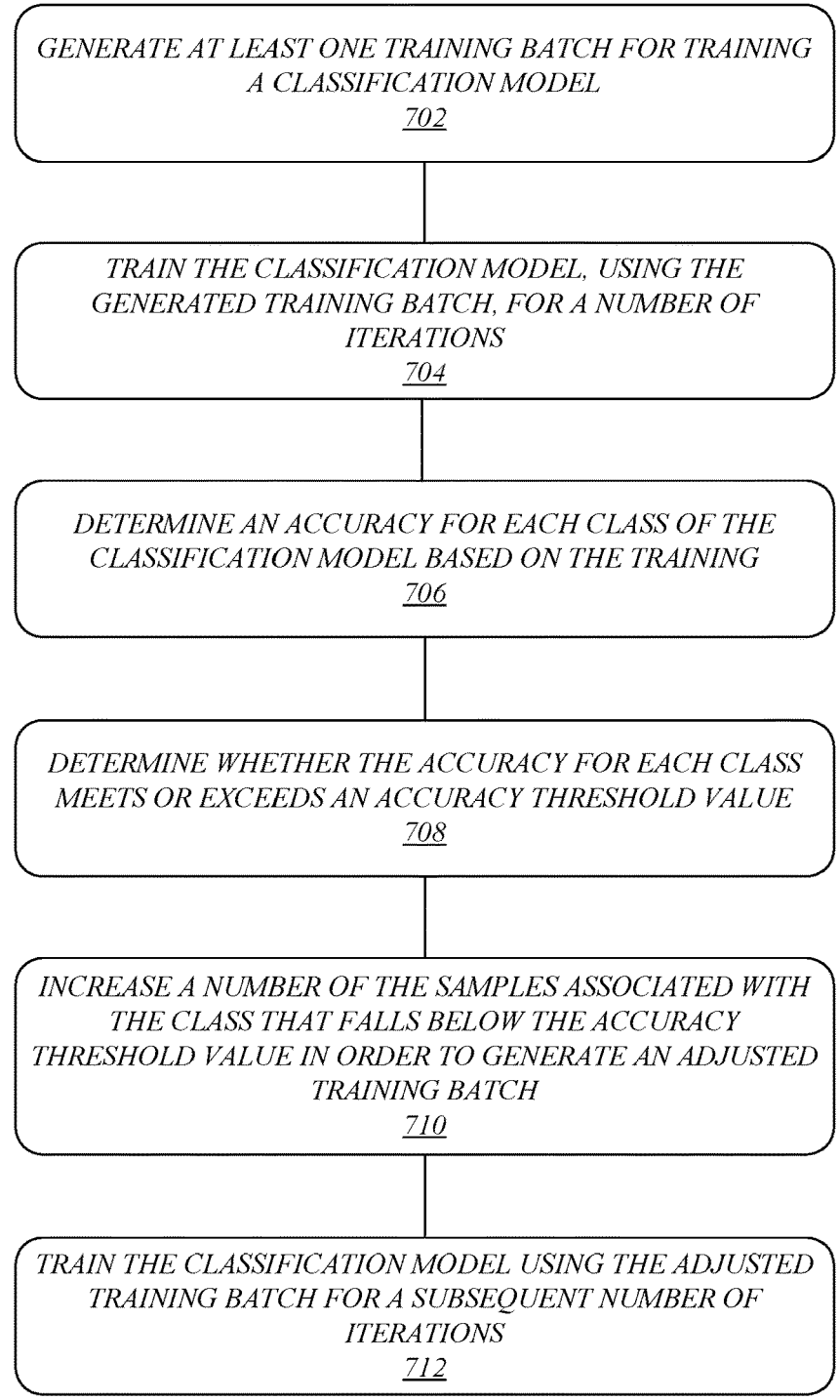
FIG. 7 illustrates an example flow diagram in accordance with one or more embodiments.

FIG. 7 illustrates a flow diagram 700 of adjusting a training batch in accordance with the embodiments of FIGS. 3A to 3E.

In block 702, similar to blocks 502 and 602, at least one training batch may be generated for training a classification model. In block 704, the classification model is trained for a number of iterations using the at least one training batch. In block 706, an accuracy is determined for each and every one of the classes in the classification model.

In block 708, it is determined whether the accuracy for each class meets or exceeds an accuracy threshold value. This value may be different from the desired accuracy. For example, it may be a lower value, which ensures that each class hits an acceptable level of accuracy even though the class may not hit the desired accuracy level. The accuracy threshold value may be predefined, predetermined, preset, dynamically determined, etc.

In bock 710, the number of the samples associated with classes that fall below the accuracy threshold value may be increased in the training batch in order to generate an adjusted training batch. How the number of samples is increased may be dynamic. It may also be based on a weighted value algorithm, as described above. Or it may be a combination or blend of different adjustment techniques. In block 712, the classification model is trained using the adjusted training batch for a subsequent number of iterations.

Figure 8:
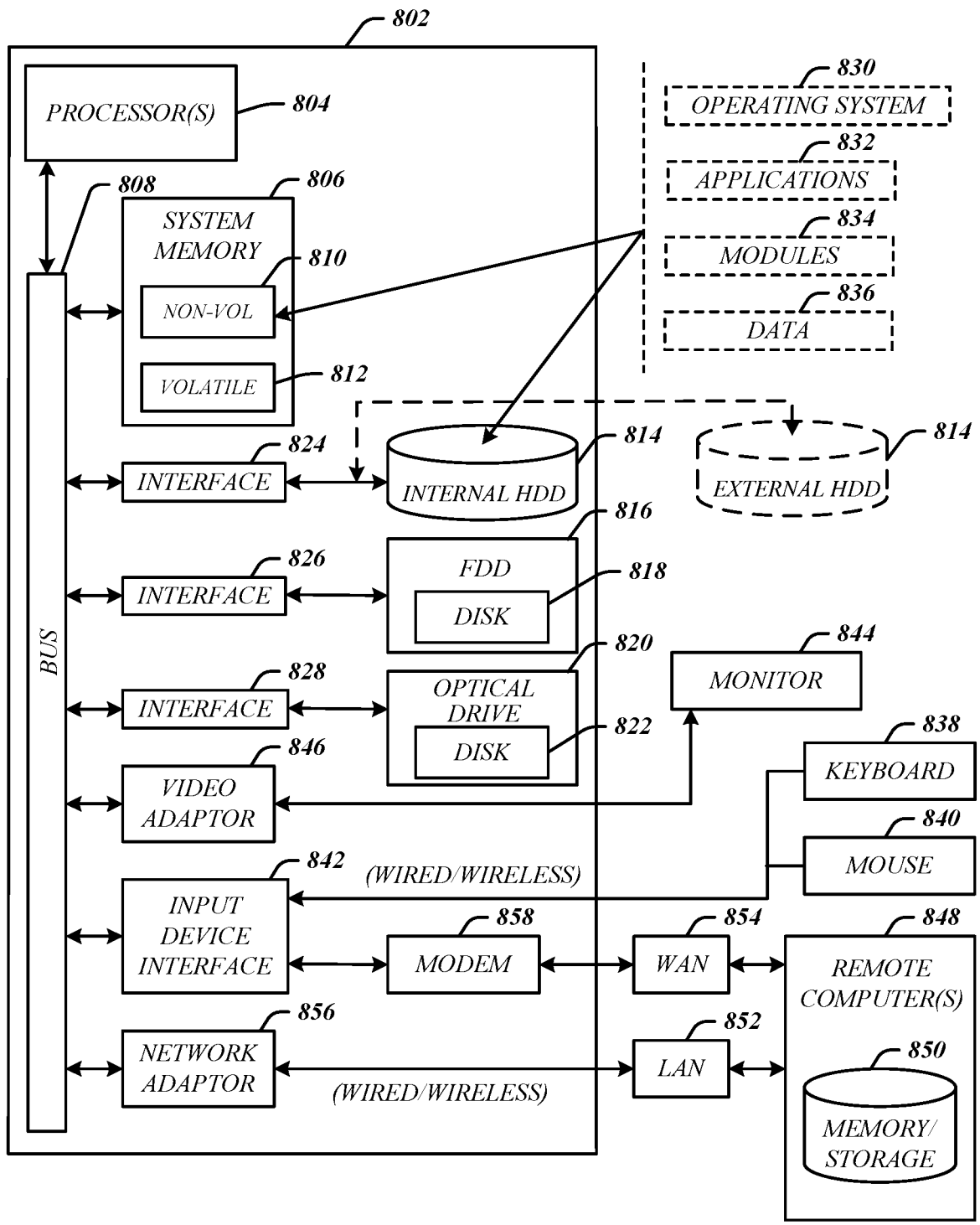
FIG. 8 illustrates an example computing architecture of a computing device in accordance with one or more embodiments.

FIG. 8 illustrates an embodiment of an exemplary computing architecture 800, e.g., of a computing device, such as a desktop computer, laptop, tablet computer, mobile computer, smartphone, etc., suitable for implementing various embodiments as previously described. In one embodiment, the computing architecture 800 may include or be implemented as part of a system, which will be further described below. At least one computing device and/or the processing circuitries thereof may be configured to generate one or more training batches, determine the accuracies of each class of a classification model, perform the adjustment of the one or more training batches according to the determined accuracies, retrain the classification model using the adjusted training batches, repeat the process until an accuracy threshold value and/or a desired or target accuracy value is achieved, etc., as set forth above.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes processor 804, a system memory 806 and a system bus 808. The processor 804 can be any of various commercially available processors, processing circuitry, central processing unit (CPU), a dedicated processor, field-programmable gate array (FPGA), etc.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 900.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 804 through an input device interface 842 that is coupled to the system bus 808 but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 9:
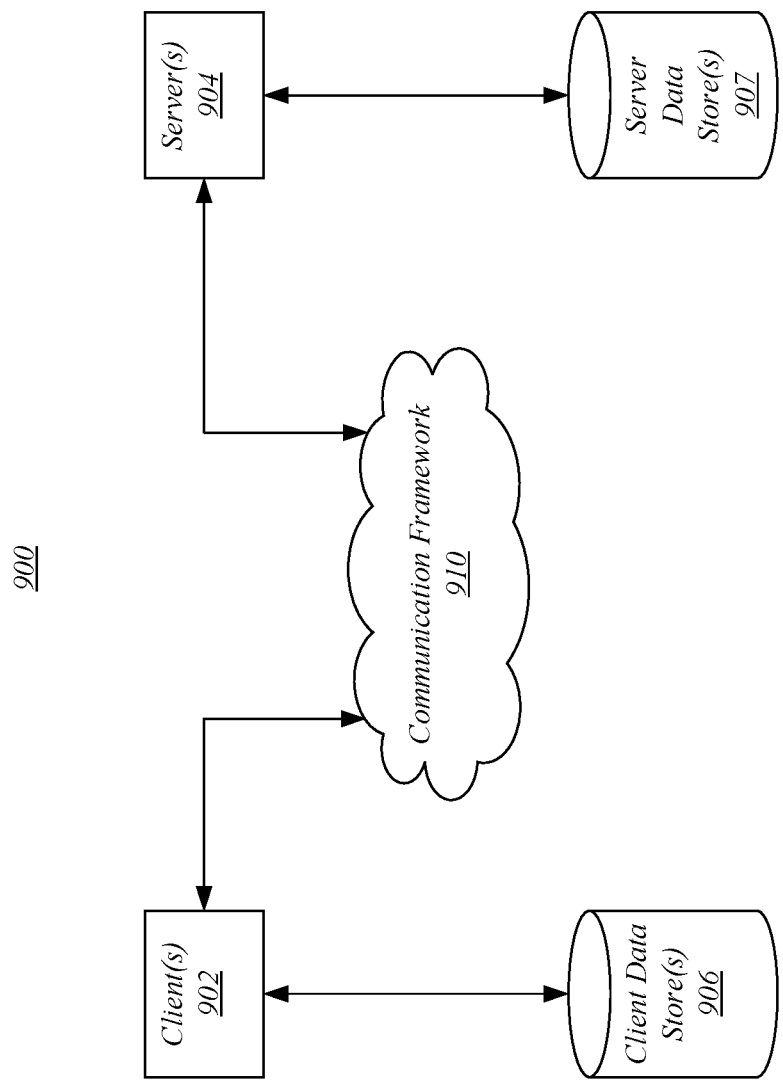
FIG. 9 illustrates an example communications architecture in accordance with one or more embodiments.

FIG. 9 is a block diagram depicting an exemplary communications architecture 900 suitable for implementing various embodiments. For example, one or more computing devices may communicate with each other via a communications framework, such as a network. At least one computing device connected to the network may be a client computing device, such as a desktop computer, laptop, tablet computer, smartphone, etc. At least one computing device connected to the network may be a server computer, which may be implemented as a back-end server. The at least one back-end server computer, for instance, may perform the training of the classification model, as set forth above, and may also perform the adjustment of the training batches. The server computer may receive user input (via the client computing device) related to any aspect of the training and/or adjusting process. For example, a user may provide the classification model itself and may provide the numerous samples associated with various classes of the classification model. The user, via user input, may also adjust the number of iterations the model can be trained for, input or adjust the accuracy threshold value, the desired or target accuracy level, and the like. In at least that regard, the server computer and the client computer may perform the training of the classification model and the adjustment of the samples in the training batches in tandem. In further embodiments, the classification model and/or samples associated with the classes of the model may be accessed or retrieved from one or more data stores communicatively coupled to either the client computers and/or the server computers.

The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 includes one or more clients 902 and servers 904. The one or more clients 902 and the servers 904 are operatively connected to one or more respective client data stores 906 and server data stores 907 that can be employed to store information local to the respective clients 902 and servers 904, such as cookies and/or associated contextual information.

The clients 902 and the servers 904 may communicate information between each other using a communication framework 910. The communications framework 910 may implement any well-known communications techniques and protocols. The communications framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
processing circuitry operable to execute stored instructions that, when executed, causes the processing circuitry to:
perform a first training of a classification model using a training batch, the training batch including a plurality of samples associated with one or more classes of the classification model;
determine whether each class of the classification model meets or exceeds a predefined accuracy level based at least in part on the first training;
determine, dynamically, a number of additional samples to allocate to each class that does not meet the predefined accuracy level based at least in part on a proportion-based analysis; and
adjust the training batch such that the determined number of additional samples are included in the training batch to provide an adjusted training batch.

2. The apparatus of claim 1, wherein the proportion-based analysis comprises the processing circuitry to:
determine a first difference between (i) a first calculated accuracy of a first class not meeting the predefined accuracy level and (ii) the predefined accuracy level;
determine a second difference between (i) a second calculated accuracy of a second class not meeting the predefined accuracy level and (ii) the predefined accuracy level; and
determine, proportionally, the number of additional samples to be allocated to the first and second classes based on the determined first and second differences.

3. The apparatus of claim 2, wherein the number of additional samples associated with the first class is greater than the number of additional samples associated with the second class if the first difference is greater than the second difference.

4. The apparatus of claim 3, wherein the number of additional samples associated with the first class is greater by one, two, three, or four times the number of additional samples associated with the second class.

5. The apparatus of claim 2, wherein the processing circuitry is further caused to:
perform a second training of the classification model using the adjusted training batch;
determine whether the first class and the second class meet or exceed the predefined accuracy level based at least in part on the second training;
determine, dynamically, a subsequent number of additional samples to allocate to the first class and/or the second class if the first class and/or the second class does not meet or exceed the predefined accuracy level;
adjust the training batch such that the subsequent number of additional samples are included in the training batch to provide a subsequent adjusted training batch; and
perform a third training of the classification model using the subsequent adjusted training batch.

6. The apparatus of claim 1, wherein the processing circuitry is further caused to:
decrease a number of the plurality of samples corresponding to the one or more classes that meet or exceed the predefined accuracy level to a minimum threshold number of samples.

7. The apparatus of claim 1, wherein the training batch has a size that is constant and or variable.

8. A method comprising:
performing a first training of a classification model using a training batch, the training batch including a plurality of samples associated with one or more classes of the classification model;
determining whether each class of the classification model meets or exceeds a predefined accuracy level based at least in part on the first training;
determining, dynamically, a number of additional samples to allocate to each class that does not meet the predefined accuracy level based at least in part on a proportion-based analysis; and
adjusting the training batch such that the determined number of additional samples are included in the training batch to provide an adjusted training batch.

9. The method of claim 8, wherein the proportion-based analysis further comprises:
determining a first difference between (i) a first calculated accuracy of a first class not meeting the predefined accuracy level and (ii) the predefined accuracy level;
determining a second difference between (i) a second calculated accuracy of a second class not meeting the predefined accuracy level and (ii) the predefined accuracy level; and
determining, proportionally, the number of additional samples to be allocated to the first and second classes based on the determined first and second differences.

10. The method of claim 9, wherein the number of additional samples associated with the first class is greater than the number of additional samples associated with the second class if the first difference is greater than the second difference.

11. The method of claim 10, wherein the number of additional samples associated with the first class is greater by one, two, three, or four times the number of additional samples associated with the second class.

12. The method of claim 9, further comprising:
performing a second training of the classification model using the adjusted training batch;
determining whether the first class and the second class meet or exceed the predefined accuracy level based at least in part on the second training;
determining, dynamically, a subsequent number of additional samples to allocate to the first class and/or the second class if the first class and/or the second class does not meet or exceed the predefined accuracy level;
adjusting the training batch such that the subsequent number of additional samples are included in the training batch to provide a subsequent adjusted training batch; and
performing a third training of the classification model using the subsequent adjusted training batch.

13. The method of claim 8, further comprising:
decreasing a number of the plurality of samples corresponding to the one or more classes that meet or exceed the predefined accuracy level to a minimum threshold number of samples.

14. The method of claim 8, wherein the training batch has a size that is constant and or variable.

15. A non-transitory computer-readable storage medium storing computer-readable program code executable by a processor to:
perform a first training of a classification model using a training batch, the training batch including a plurality of samples associated with one or more classes of the classification model;
determine whether each class of the classification model meets or exceeds a predefined accuracy level based at least in part on the first training;
determine, dynamically, a number of additional samples to allocate to each class that does not meet the predefined accuracy level based at least in part on a proportion-based analysis; and
adjust the training batch such that the determined number of additional samples are included in the training batch to provide an adjusted training batch.

16. The non-transitory computer-readable storage medium of claim 15, wherein the proportion-based analysis comprises the computer-readable program code causing the processor to:
determine a first difference between (i) a first calculated accuracy of a first class not meeting the predefined accuracy level and (ii) the predefined accuracy level;
determine a second difference between (i) a second calculated accuracy of a second class not meeting the predefined accuracy level and (ii) the predefined accuracy level; and
determine, proportionally, the number of additional samples to be allocated to the first and second classes based on the determined first and second differences.

17. The non-transitory computer-readable storage medium of claim 16, wherein the number of additional samples associated with the first class is greater than the number of additional samples associated with the second class if the first difference is greater than the second difference.

18. The non-transitory computer-readable storage medium of claim 17, wherein the number of additional samples associated with the first class is greater by one, two, three, or four times the number of additional samples associated with the second class.

19. The non-transitory computer-readable storage medium of claim 16, wherein the computer-readable program code further causes the processor to:
perform a second training of the classification model using the adjusted training batch;
determine whether the first class and the second class meet or exceed the predefined accuracy level based at least in part on the second training;
determine, dynamically, a subsequent number of additional samples to allocate to the first class and/or the second class if the first class and/or the second class does not meet or exceed the predefined accuracy level;
adjust the training batch such that the subsequent number of additional samples are included in the training batch to provide a subsequent adjusted training batch; and
perform a third training of the classification model using the subsequent adjusted training batch.

20. The non-transitory computer-readable storage medium of claim 15, wherein the computer-readable program code further causes the processor to:
decrease a number of the plurality of samples corresponding to the one or more classes that meet or exceed the predefined accuracy level to a minimum threshold number of samples.

* * * * *